United States Patent
Mitchell

(10) Patent No.: US 6,503,999 B1
(45) Date of Patent: Jan. 7, 2003

(54) USE OF BETA-HYDROXYALKYLAMIDE IN AMBIENT AND LOW BAKE LIQUID COATINGS

(75) Inventor: Katherine P. Mitchell, Pickerington, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/873,482

(22) Filed: Jun. 4, 2001

(51) Int. Cl.$^7$ .............................................. C08G 18/32
(52) U.S. Cl. ........................... 528/80; 528/85; 525/131; 427/388.4; 428/425.8; 428/423.1; 524/839; 524/840; 252/182.26
(58) Field of Search ............................. 525/131; 528/80, 528/85; 427/388.4; 428/425.8, 423.1; 524/839, 840; 252/182.26

(56) References Cited

U.S. PATENT DOCUMENTS

| | | | |
|---|---|---|---|
| 4,076,917 A | 2/1978 | Swift et al. ................... | 526/49 |
| 4,101,606 A | 7/1978 | Cenci et al. ......... | 260/857 UN |
| 4,115,637 A | 9/1978 | Cenci et al. ................... | 526/56 |
| 4,138,541 A | 2/1979 | Cenci et al. ................. | 526/303 |
| 4,190,693 A * | 2/1980 | Martorano et al. | |
| 4,727,111 A | 2/1988 | Pettit, Jr. et al. ........... | 525/190 |
| 4,788,255 A | 11/1988 | Pettit, Jr. et al. ........... | 525/131 |
| 4,801,680 A | 1/1989 | Geary et al. ................. | 528/272 |
| 4,889,890 A | 12/1989 | Kerr et al. .................... | 525/113 |
| 4,937,288 A | 6/1990 | Pettit, Jr. et al. ........... | 525/176 |
| 4,988,767 A | 1/1991 | Pettit, Jr. et al. ........... | 525/194 |
| 5,013,791 A | 5/1991 | Kerr et al. .................... | 525/113 |
| 5,182,337 A | 1/1993 | Pettit, Jr. et al. ........... | 525/176 |
| 5,214,101 A | 5/1993 | Pettit, Jr. et al. ........... | 525/176 |
| 5,266,628 A | 11/1993 | Essary et al. ................ | 524/556 |
| 5,538,759 A * | 7/1996 | Hoppe | |

FOREIGN PATENT DOCUMENTS

JP  2000072732  *  3/2000

* cited by examiner

Primary Examiner—Rachel Gorr
(74) Attorney, Agent, or Firm—Diane R. Meyers

(57) ABSTRACT

An aqueous coating composition comprising an active hydrogen-containing polymer, an isocyanate, and beta-hydroxyalkylamide is disclosed. The polymer can be any number of polymers containing hydroxyl, amine and/or thiol groups, such as an acrylic polyol, a polyester polyol, and mixtures thereof. The hydroxylalkylamide has been shown to decrease the time in which the coating achieves hardness and, in the case of the polyester polyol system, increases the hardness that is achieved. The present compositions also provide resistance to chemical exposure. Methods for coating a substrate and the substrates coated thereby are also disclosed.

35 Claims, No Drawings

USE OF BETA-HYDROXYALKYLAMIDE IN AMBIENT AND LOW BAKE LIQUID COATINGS

FIELD OF THE INVENTION

The present invention relates generally to liquid film-forming compositions having isocyanate crosslinking agents, polyols having groups that are reactive with isocyanates, and beta-hydroxyalkylamide. The present invention further relates to methods for coating substrates using the present compositions, and substrates coated therewith.

BACKGROUND INFORMATION

Isocyanate crosslinked systems have been used in coating compositions. Because isocyanates are reactive with active hydrogen-containing compounds such as water, one component systems historically have been formulated using organic solvents. Alternatively, waterborne systems have been formulated by using blocked isocyanate groups. The switch from organic solvents to water is neither simple nor straightforward, particularly since many isocyanate crosslinkers are not only reactive with water but are also hydrophobic and non-dispersible.

SUMMARY OF THE INVENTION

The present invention is directed to waterborne coating compositions comprising an active hydrogen-containing polymer, an isocyanate, and beta-hydroxyalkylamide. The present invention is further directed to methods for coating a substrate comprising applying the present coating compositions to the substrate. The compositions and methods find particular application in coating light industrial equipment.

It has been discovered that the use of isocyanate in conjunction with beta-hydroxyalkylamide ("HAA") can result in a coating with improved hardness and chemical resistance, and increased viscosity when cured at either ambient or low bake temperatures. These improvements are achieved without any reduction in humidity or salt spray resistance. The use of HAA in conjunction with an isocyanate in systems curable at ambient or low-bake temperatures is not believed to have been previously reported. By "low bake" is meant about 60° C. or less. Thus, the present compositions and methods are particularly applicable in the refinish area, where equipment cannot be subjected to the high cure temperature requirements of many coating compositions.

It is a feature of this invention that the present coating compositions have decreased hardening time; that is, the present compositions achieve a desired level of hardness in a shorter amount of time than compositions that lack the HM additive. Such a characteristic is of particular interest to many markets in which the ability to rapidly finish and ship equipment and/or parts is desired. In addition to decreasing the time in which the present coatings achieve the desired hardness, several of the systems described herein have improved hardness as compared with compositions that do not use the HAA additive.

The present compositions also provide resistance to various chemicals; this resistance is particularly apparent when using the polyester polyol systems described herein.

As used herein, unless otherwise expressly specified, all numbers such as those expressing values, ranges, amounts or percentages may be read as if prefaced by the word "about", even if the term does not expressly appear. Also, as used herein, the term "polymer" is meant to refer to oligomers and both homopolymers and copolymers.

DETAILED DESCRIPTION OF THE INVENTION

The present invention is directed to an aqueous composition comprising an active hydrogen-containing polymer; an isocyanate compound; and beta-hydroxyalkylamide ("HAA"). An active hydrogen-containing polymer, as that term is used herein, refers to polymers that contain active hydrogens, such as those provided by hydroxyl, primary amino, secondary amino and/or thiol groups. The active hydrogens are reactive with the isocyanate groups; this reaction results in the curing of the material at either ambient or low bake temperatures. Thus, any polymer containing one or more active hydrogens is an active hydrogen-containing polymer suitable for use in the present invention. Examples include acrylic polymers, polyester polymers, polyurethane polymers and polymers derived from epoxy compounds. In one embodiment, the active hydrogens are provided by hydroxyl groups and the hydroxy-containing polymer is an acrylic polyol, a polyester polyol, or mixtures thereof.

The acrylic polyol component of the present invention contains both (i) hydroxyl functionality capable of reacting with isocyanate groups ("hydroxyl-reactive") and (ii) hydrophilic functionality capable of rendering the surface active isocyanate-reactive material water dispersible. Hydrophilic functionality is well known to those skilled in the coatings art and includes, most commonly, anion generating, cation generating and hydrophilic non-ionic functional groups. By "anion generating" and "cation generating" are meant functionalities such as carboxyl (anion generating) or amino (cation generating) which, when appropriately neutralized, become hydrophilic in nature. Hydrophilic non-ionic functionality is itself hydrophilic in nature, and includes, for example, alkylene oxide units. The amount of hydrophilizing functionality present in the acrylic polyol should, upon at least partial neutralization of the anion generating or cation generating groups (if present), be sufficient to render the polyol water-dispersible.

In some embodiments the acrylic polyol is an acrylic copolymer having the hydrophilic functionality and hydroxyl-reactive functionality incorporated into the polymer via appropriate monomer selection or subsequent modification. Examples of monomers that may be utilized to synthesize the acrylic polyol include carboxyl group-containing ethylenically unsaturated monomers and hydroxyl group-containing ethylenically unsaturated monomers.

The acrylic polyol described in U.S. Pat. No. 6,005,045 is particularly suitable for use in the present invention. There, the active hydrogen-containing acrylic copolymers have a glass transition temperature ($T_g$) greater than about 0° C. $T_g$ is described in PRINCIPLES OF POLYMER CHEMISTRY, Flory, Cornell University Press, Ithaca, N.Y., 1953, at pages 52–57. $T_g$ can be calculated as described by Fox in Bull. Amer. Physic. Society, 1,3, page 123 (1956). $T_g$ can be measured experimentally by using a penetrometer such as a Du Pont 940 Thermomedian Analyzer. $T_g$ of the polymers as used herein refers to the calculated values unless otherwise indicated.

Suitable acrylic polyols are copolymers of one or more polymerizable acrylic monomers, at least some of which include hydrophilic functionality such as acid functional acrylic monomers, amine functional acrylic monomers, and hydroxyl functional acrylic monomers. The copolymers may also be made with additional polymerizable unsaturated monomers such as vinyl monomers. The copolymers may be prepared in organic solvent using conventional free radical polymerization techniques. The copolymers of the U.S. Pat. No. 6,005,045 contain about 5 to about 80, such as about 10 to about 40 percent by weight, of a polymerizable ethylenically unsaturated aromatic monomer; about 5 to about 80, such as from about 10 to 40 percent by weight, of an ethylenically unsaturated hydroxyl functional acrylic monomer; and about 20 to about 95, such as about 30 to about 70 percent by weight, of at least one ethylenically unsaturated monomer different from the other two named above. Weight percents are based on the total solid weight of monomers used to prepare the acrylic polyol.

The ethylenically unsaturated aromatic monomer used to synthesize the acrylic polyol may be selected from monomers such as styrene and alpha-methyl styrene, including substituted styrene or substituted alpha-methyl styrene where substitution is in the para position and is a linear or branched alkyl group having from about 1 to about 20 carbon atoms; examples include but are not limited to vinyl toluene, 4-vinylanisole, and 4-vinylbenzoic acid. The ethylenically unsaturated aromatic monomer may also contain fused aryl rings. Examples include 9-vinylanthracene and 9-vinylcarbazole. Mixtures of monomers may also be used. By "monomer" is meant true monomer; that is, it is not intended to include dimers, such as alpha-methyl styrene dimer, trimers, or oligomers.

The ethylenically unsaturated hydroxyl functional monomer used to synthesize the acrylic polyol may be selected from, for example, hydroxyethyl acrylate, hydroxyethyl methacrylate, hydroxypropyl acrylate, hydroxypropyl methacrylate, hydroxybutyl acrylate, hydroxybutyl methacrylate, and mixtures thereof, with hydroxyethyl methacrylate being particularly suitable.

Additional different ethylenically unsaturated monomers used to prepare the acrylic polyol include acid group-containing acrylic monomers such as acrylic acid and methacrylic acid; amine groups containing monomers such as dimethylaminoethyl methacrylate, tert-butylaminoethyl methacrylate; and meta-isopropenyl-α,α-dimethyl benzylamine; alkyl esters of acrylic acid or methacrylic acid such as those having 1 to 10 carbon atoms in the alkyl group such as methyl methacrylate, butyl acrylate, butyl methacrylate, 2-ethylhexyl methacrylate and cyclohexyl methacrylate and other polymerizable ethylenically unsaturated monomers including nitriles such as acrylonitrile and methacrylonitrile; vinyl and vinylidene halides such as vinyl chloride and vinylidene fluoride and vinyl esters such as vinyl acetate.

Acid and amine functional monomers such as acrylic and methacrylic acid and dimethylaminoethyl methacrylate, terf-butylaminoethyl methacrylate, and meta-isopropenyl-α, α-dimethylbenzyl amine are particularly suitable because upon neutralization of the acid or amine group, the polyol is made hydrophilic. The acid or amine functional monomer can be used in amounts of up to about 25% by weight, such as about 1.0 to about 10.0%, based on the total solid weight of monomers used to prepare the acrylic polymer. The alkyl esters of acrylic and methacrylic acid are used in amounts of up to about 89%, such as about 30 to about 80% by weight, based on total solid weight of monomers used to prepare the acrylic polyol. The other copolymerizable ethylenically unsaturated monomers, when used, can be present in amounts of up to about 80%, such as about 10 to about 40%, by weight based on total solid weight of monomers used to prepare the acrylic polyol.

The acrylic polyol typically has a number average molecular weight ($M_n$) of about 700 to about 50,000, such as about 1000 to about 12,000, as determined by gel permeation chromatography using a polystyrene standard; an acid number, in the case of anion generating groups, of about 15 to about 150 mg KOH/g resin, such as about 20 to about 70 mg KOH/g resin, or about 20 to about 35 mg KOH/g resin; and an amount of active hydrogen groups from about 2.5% to about 6% by weight, such as about 3% to about 5% by weight, or about 3.5% to about 4.5% by weight, on a 100% solids basis. Significantly, a composition made with the present acrylic polyol will not gel in the absence of HAA, as demonstrated in the examples.

The polyester polyol of the present invention can be any water reducible polyester known in the art. They are prepared by conventional techniques, such as condensation, utilizing diols, triols and polyhydric alcohols with polycarboxylic acids. Suitable polyhydric alcohols, optionally combined with monohydric alcohols, include ethylene glycol, propylene glycol, butylene glycol, 1,6-hexylene glycol, neopentyl glycol, diethylene glycol, glycerol, trimethylolpropane, and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid, trimellitic acid, isophthalic acid, terephthalic acid, glutaric acid and mixtures thereof. Besides the polycarboxylic acids mentioned above, functional equivalents of the polycarboxylic acids, such as anhydrides where they exist, or lower alkyl esters of the polycarboxylic acids, such as the methyl esters, may be used. Anhydrides of these acids are, therefore, encompassed by the term "polycarboxylic acid".

Polyester polyols can have molecular weights as low as about 500 and as high as about 50,000, such as in the range of about 1000 to 5000, as determined by gel permeation chromatography using a polystyrene standard. The polyester polyol can have a hydroxyl equivalent weight on solids of between about 200 and 1600, such as about 876; an acid number of about 50 to 60 KOH/g resin; and a nonvolatile solids content of between about 25% and 80% by weight, or about 75% by weight on a 100% solids basis. A particularly suitable polyester polyol is commercially available from McWhorter Technologies as POLYMAC® WR 72-7203.

Polyurethane polyols can also be used. These polyols can be prepared by reacting a polyol with polyisocyanate (OH/NCO equivalent ratio greater than 1:1) so that free hydroxyl groups are present in the product. Suitable polyols include, for example, polyester polyols, acrylic polyols or any other suitable polymeric polyols. Mixture of both high molecular weight and low molecular weight polyols may be used. Low molecular weight polyols include, for example, diols and triols such as aliphatic polyols including alkylene polyols containing from 2 to 18 carbon atoms. Examples include ethylene glycol, 1,4-butane diol, 1,6-hexane diol, cycloaliphatic polyols such as 1,2-hexane diol and cyclohexane dimethanol. Examples of triols include trimethylolpropane and trimethylolethane. Also useful are polyols containing ether linkages such as diethylene glycol and triethylene glycol. Also, acid-containing polyols, such as dimethylolpropionic acid, can be used.

The organic isocyanate that can be used to prepare the polyurethane polyols can be an aliphatic or aromatic isocyanate or a mixture of the two. Mono-, di- and polyisocyanates and mixtures thereof can all be used. Where higher functionality polyisocyanates are used, some reactive material to reduce the functionality of the polyisocyanate may be used, for example alcohols and amines. Also, some monofunctional isocyanate may be present. Examples of suitable higher polyisocyanates are 1,2,4-benzenetriisocyanate and polymethylene polyphenyl isocyanate. Examples of suitable monoisocyanates are butyl isocyanate, cyclohexyl isocyanate, phenyl isocyanate and toluene isocyanate. Examples of suitable aromatic diisocyanates are 4,4'-diphenylmethane diisocyanate, 1,3-phenylene diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be used, including but not limited to, 1,4-cyclohexyl diisocyanate, isophorone diisocyanate, alpha,alpha-xylylene diisocyanate and 4,4'-methylene-bis-(cyclohexyl isocyanate).

Hydroxyl group-containing epoxy polymers can also be used according to the present invention. Such polymers are described in U.S. Pat. Nos. 3,663,389; 3,947,339 and 4,116,900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

Modified polymers such as those obtained by chain-extending the polyepoxide to increase its molecular weight can also be used in the practice of the invention. Such materials are described in U.S. Pat. No. 4,148,772 in which the polyepoxide is chain extended with a polyester polyol and in U.S. Pat. No. 4,468,307 in which the polyepoxide is chain extended with a particular polyether polyol. Also, chain-extension methods such as those disclosed in Canadian Patent No. 1,179,443 can be used.

Epoxy polymers that can be used in preparing the polymers are polyepoxides, that is, polymers having an epoxy equivalency greater than 1, such as about 2 or more. Polyepoxides which contain 1,2-epoxide groups and which are difunctional with regard to epoxy can be used, such as polyglycidyl ethers of cyclic polyols including, for example, polyglycidyl ethers of polyphenols such as bisphenol A.

Examples of polyepoxides are given in U.S. Pat. No. 4,260,716, column 3, line 20 to column 4, line 30, the portions of which are hereby incorporated by reference.

Besides the epoxy polymers disclosed above, other epoxy-containing polymers which can be used are acrylic polymers which contain epoxy groups. These polymers are formed by polymerizing an unsaturated epoxy group-containing monomer such as glycidyl acrylate or methacrylate with one or more other polymerizable ethylenically unsaturated monomers. Examples of those polymers are described in U.S. Pat. No. 4,001,156, column 3, line 59 to column 5, line 60, the portions of which are hereby incorporated by reference.

Polyepoxide-amine adducts can also be used. Examples of amines which can be used in preparing the polyepoxide-amine adduct are ammonia, primary, secondary and tertiary amines and mixtures thereof. The reaction product of the polyepoxide and the amine can be at least partially neutralized with an acid to form a polymeric product containing amine salt and/or quaternary ammonium salt groups. Reaction conditions of polyepoxides with amines, examples of various amines and at least partial neutralization with acid are disclosed in U.S. Pat. No. 4,260,720, column 5, line 20 to column 7, line 4, the portions of which are hereby incorporated by reference.

The use of HAA in the present compositions increases the rate at which the desired level of hardness is achieved when the compositions are applied to a substrate. The present compositions also provide improved resistance to chemicals, such as gasoline, ketone, toluene and the like. In the case of the polyester polyol, a dramatic improvement is seen in chemical resistance. In addition, when using the polyester polyol, the degree of hardness attained is greater with the present compositions than with compositions lacking HAA.

Any suitable isocyanate compound or mixture of compounds can be used as the curing agent in the present invention, including mono-, di-, and polyisocyanates, and mixtures thereof. To function as an effective crosslinking agent, the isocyanate should have at least two reactive isocyanate groups. Either liquid or solid organic isocyanates can be used. Because this system is an ambient or low bake cure system, it will be understood that the isocyanates are unblocked.

Suitable polyisocyanate crosslinking agents may contain aliphatically, cycloaliphatically, araliphatically and/or aromatically bound isocyanate groups. Mixtures of polyisocyanates are also suitable. Polyisocyanates containing aliphatically, cycloaliphatically and/or araliphatically bound polyisocyanate are particularly suitable. This includes, for example: hexamethylene diisocyanate, 2,2,4-trimethylhexamethylene diisocyanate, 2,4,4-trimethylhexamethylene diisocyanate, meta-$\alpha,\alpha,\alpha',\alpha'$-tetramethylxylylenediisocyanate, 1-isocyanato-3,3,5-trimethyl-5-isocyanatomethyl cyclohexane (isophorone diisocyanate or "IPDI"), bis(4-isocyanatocyclohexyl)methane(hydrogenated MDI), biuret derivatives of various diisocyanates including, for example, hexamethylene diisocyanate available under the trade designation DESMODUR® N, uretdione derivatives of various diisocyanates including, for example, hexamethylene diisocyanate and IPDI, isocyanurate derivatives of various diisocyanates including, for example, hexamethylene diisocyanate and IPDI (commercially available under the trade designation IPDI® T 1890 polyisocyanate of Huls America, Inc., Piscataway, N.J.), and urethane adducts of diisocyanates with polyols such as ethylene glycol, propylene glycol, neopentyl glycol, trimethylolpropane, pentaerythritol and the like, as well as oligomeric and polymeric polyols. Particularly suitable are those polyisocyanate crosslinking agents having at least one non-primary isocyanate group. Also, suitable are the urethane diisocyanate/polyol adducts, such as those having NCO content of at least 10 weight percent (on a 100% solids basis), and especially those wherein the diisocyanate contains at least one non-primary isocyanate group. Particularly suitable are such urethane adducts having an average NCO functionality of greater than 2, and especially the diisocyanate/trimethylolpropane adduct, of which the 3:1 meta-$\alpha,\alpha,\alpha',\alpha'$-tetramethylxylylenediisocyanate/trimethylolpropane adduct is an example. Such an adduct is commercially available under the trade designation CYTHANE® 3160 aliphatic polyisocyanate of Cytec Industries, Inc., West Paterson, N.J. Another example of a diisocyanate/trimethylolpropane adduct is a 3:1 IPDI/trimethylolpropane adduct commercially available under the trade designation SPENLITE®P 25-A4-60 aliphatic urethane prepolymer of Reichhold Chemicals, Research Triangle, North Carolina. Other mono- and polyisocyanates useful in the present invention are listed in U.S. Pat. No. 4,452,681, which is hereby incorporated by reference in its entirety.

The HAA compound used according to the present invention has the following general Formula (I):

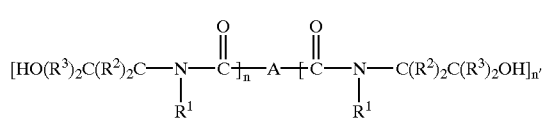

(I)

wherein A is a bond; hydrogen or a monovalent or polyvalent organic radical derived from a saturated or unsaturated alkyl radical wherein the alkyl radical contains from 1 to 60 carbon atoms, such as methyl, ethyl, propyl, butyl, pentyl, hexyl, heptyl, octyl, nonyl, decyl, eicosyl, triacontyl, tertracontyl, pentacontyl, hexylcontyl and the like; aryl, for example, mono- and dinuclear aryl such as phenyl, naphthyl and the like; tri-lower alkyleneamino such as trimethyleneamino, triethyleneamino and the like; or an unsaturated radical containing one or more ethylenic groups [>C=C<] such as ethenyl, 1-methylethenyl, 3-butenyl-1,3-diyl, 2-propenyl-1,2-diyl, carboxy lower alkenyl, such as 3-carboxy-2-propenyl and the like, lower alkoxy carbonyl lower alkenyl such as 3-methoxycarbonyl-2-propenyl and the like; $R^1$ is hydrogen, lower alkyl of from 1 to 5 carbon atoms such as methyl, ethyl, n-propyl, n-butyl, sec-butyl, tert-butyl, pentyl and the like or hydroxy lower alkyl of from 1 to 5 carbon atoms such as hydroxyethyl, 3-hydroxypropyl, 2-hydroxypropyl, 4-hydroxybutyl, 3-hydroxybutyl, 2-hydroxy-2-methyl-propyl, 5-hydroxypentyl, 4-hydroxypentyl, 4-hydroxypentyl, 3-hydroxypentyl, 2-hydroxypentyl and the isomers of pentyl; $R^2$ and $R^3$ are the same or different radicals selected from hydrogen, straight or branched chain lower alkyl of from 1 to 5 carbon atoms or one of the $R^2$ and one of the $R^3$ radicals may be joined to form, together with the carbon atoms, cyclopentyl, cyclohexyl and the like; n is an integer having a value of 1 or 2 and n' is an integer having a value of 0 to 2 or when n' is 0, a polymer or copolymer (i.e., n has a value greater than 1, such as 2 to 10) formed from the beta-hydroxyalkylamide when A is an unsaturated radical.

Particularly suitable compounds include those of Formula I, wherein $R^1$ is H, lower alkyl, or $HO(R^3)^2C(R^2)^2C-$, n and n' are each 1, $-A-$ is $-(CH^2)m-$, m is 0 to 8, each $R^2$ is H, and one of the $R^3$ radicals is H and the other is H or a $C_1-C_5$ alkyl.

A particularly suitable HAA is bis[N,N-di(beta-hydroxyethyl)] adipamide. Such a compound is represented by Formula I, wherein $R^1$ is $C(R^2)_2$ $C(R^3)_2OH$, $R^2$ and $R^3$ are both H in both cases, n and n' are 1, A is $-(CH_2)_m-$ and m is 4. This composition is commercially available from EMS Chemie as PRIMID XL 552.

The HAA is typically present in an amount of approximately 5 weight percent, based on total solids, or less. When HAA is used in a weight percent of above about 5, the composition often becomes too brittle and yellows in water. Moreover, due to cost constraints, greater than about 5 weight percent HAA is not commercially realistic.

In addition to the components discussed above, other additives can also be incorporated, such as neutralizing agents for rendering the surface active isocyanate reactive material water-dispersible, cure catalysts, and relatively minor amounts of organic solvent.

When an acid group is present on the active hydrogen-containing polymer, any base may be used as the neutralizing agent to produce an anionic surface active material. Normally, a base capable of converting a carboxyl group to a carboxylate ion is used as the neutralizing agent, including organic and inorganic bases such as sodium and potassium hydroxide, sodium and potassium carbonate, and amines such as ammonia, primary, secondary, and tertiary amines. Similarly, when an amine group is present on the active hydrogen-containing polymer, any acid may be used as the neutralizing agent to produce a cationic surface active material. The total amount of neutralizing agent should be sufficient to emulsify the isocyanate, the polyol and other optional ingredients. Examples include dimethylethanol amine (DMEA) and triethanol amine (TEA).

Cure catalysts for isocyanates are well known to those skilled in the art such as organometallic catalysts and, particularly, organotin compounds such as dibutyltin diacetate, dibutyltin dioxide, dibutyltin dilaurate and the like.

The organic solvents are generally those present in the various components. For example, many coating components are not commercially available on a 100% solids basis, but are rather a somewhat lower solids content in an appropriate solvent.

Other optional ingredients such as, plasticizers, surfactants, defoamers, thixotropic agents, anti-gassing agents, organic cosolvents, flow controllers, anti-oxidants, UV light absorbers and similar additives conventional in the art may be included in the composition.

The compositions of the present invention can be made as two separate components, or what is referred to in the art as a "two pack" system. In the first component of the two-component system, the appropriate active hydrogen-containing polymer and HAA are present. The second component comprises the isocyanate. The first component can be prepared, for example, by mixing the desired polymer with a neutralizing agent, such as DMEA or TEA and deionized water. HAA can then be added with slow mixing until the HAA is dissolved; this typically takes between about 5 and 10 minutes. Any cosolvent, toner, or other optional ingredients can then be added if desired. The isocyanate should be mixed with the polymer/HAA mixture just prior to use. The amount of first component to second component should be enough to achieve an NCO:OH ratio of between about 0.5 and 1.8. Typically, the ratio is between about 1.1 and 1.4, such as 1.2. These NCO:OH ratios take into account the hydroxyl groups present on the HAA. Additional deionized water may be used to achieve the desired viscosity. For example, between about 5 and 75 weight percent, such as about 50 percent, based on the total weight, water can be added.

As noted above, components 1 and 2 should be mixed, typically by incorporating the isocyanate into the active hydrogen-containing polymer/HAA component, just before use. This can be done, for example, in the head of a plural component spray gun, or in a container prior to entering the spray booth. The polyol and isocyanate should be incorporated rapidly, or the result will be a nonhomogenous mix that will not reincorporate and will not be usable. The mixture is typically at a sprayable viscosity for approximately 4 to 6 hours and will begin to lose gloss if applied more than 2 to 3 hours after it is mixed. These time periods will be shortened considerably if less water is added in the final reduction step. The weight percent of solids in a composition that has undergone reduction to a sprayable viscosity will typically be between about 25 and 55.

The coating compositions of the present invention have numerous applications. For example, the film-forming composition of the present invention can be used as a clear coat applied alone to a substrate or on top of a colored base coat as part of a multi-component composite coating composition. Suitable base coats include any known to those skilled in the art.

Alternatively, the composition of the present invention may contain color pigments conventionally used in surface coatings and may be used as a base coat or high gloss monocoat, that is, a high gloss pigmented coating. By "high gloss", it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

Color pigments conventionally used in surface coatings are suitable and include, for example, inorganic pigments such as titanium dioxide, iron oxides, chromium oxide, lead chromate, and carbon black, and organic pigments such as phthalocyanine blue and phthalocyanine green. Mixtures of these pigments may also be used. Suitable metallic pigments include, in particular, aluminum flake, copper bronze flake and metal oxide coated mica, nickel flakes, tin flakes, and mixtures thereof.

When present, the pigment is incorporated into the coating composition in amounts of about 1 to about 80 percent by weight based on the total weight of coating solids. The metallic pigment is employed in amounts of about 0.5 to about 25 percent by weight based on the total weight of coating solids. The present composition will typically be in dispersion form when pigment is present.

The compositions of the present invention can further be formulated into a primer.

Thus, the present composition can be incorporated into any number of coating compositions alone or in conjunction with various other coating chemistries. For example, an epoxy primer can be used under the composition as a topcoat, a one component alkyd topcoat can be applied over the present composition used in a urethane primer, etc. The advantages of the present composition, including faster hardening, chemical resistance and increased viscosity, are achieved regardless of the final formulation into which the composition may be incorporated.

The film-forming compositions can be applied to various substrates to which they adhere including wood, both ferrous and non-ferrous metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

The thickness of the present composition when applied as a coating can be between about 0.01 and 5 mils or greater, but is more suitably a thickness of about 2.5 mils or less; thicker layers can experience foaming or bubbling during application that leads to flaws in the finish.

After application of the composition to the substrate, the coated substrate is allowed to cure at ambient temperature. The coated substrate may also be heated as desired, but typically not greater than to about 60° C. In the curing operation, solvents are driven off and the film-forming materials crosslink.

The present invention is, therefore, also directed to a method for coating a substrate comprising applying to the substrate the coating composition of the present invention and curing said coating. As noted above, the curing can be effected by drying at ambient temperature, or by applying low bake heat. A substrate coated with the present coatings is also within the scope of the present invention. As noted above, the thickness of the coating is typically about 2.5 mils or less, but can be as thick as 5 mils or even thicker, or as thin as 0.01 mils.

EXAMPLES

The following examples are intended to illustrate the invention, and should not be construed as limiting the invention in any way.

Example 1

Twelve different compositions were prepared using the components set forth in Table 2. As can be seen, the polyol used, the amount of HAA used, and the NCO:OH ratio varied from sample to sample. The sample compositions described below were all prepared as follows:

The polyol resin and neutralizing agent were added to a suitably sized container and mixed thoroughly. To the container was then added deionized water in an amount to sufficiently solubilize the resin; the ingredients were mixed thoroughly. HAA was then added to the resin mixture and slowly mixed until the HAA was completely dissolved; this took between about 5 and 10 minutes. An oxo-hexyl acetate cosolvent was added, as was a toner (pre-dispersed pigment). The composition was then mixed with enough isocyanate to achieve an NCO:OH ratio of either 1.2 or 1.4, as indicated in the Table. The isocyanate was incorporated into the polyol composition immediately prior to application to the test panels.

The acrylic polyol used in Samples 7 to 12 was prepared by mixing the reactants, solvents and other ingredients listed in Table 1 by the standard art method of free radical polymerization.

TABLE 1

| REACTANTS (wt %) | |
|---|---|
| 01.958 | Mercaptoethanol-2 |
| 18.629 | Styrene |
| 40.688 | N-butyl acrylate |
| 34.313 | Hydroxyethyl methacrylate |
| 04.412 | Glacial acrylic acid inhibited |
| SOLVENT (wt %) | |
| 39.420 | Propanoic acid, 3-ethoxy-ethyl ester |
| 39.420 | Butoxy ethanol acetate-2 |
| 20.040 | Methyl ether propylene glycol acetate |
| 00.660 | Propanone-2 |
| 00.460 | N-butyl acrylate |
| OTHER (wt %) | |
| 07.620 | T-amylperoxy-2-ethyl hexanoate |

TABLE 2

| | | | | | | | | | |
|---|---|---|---|---|---|---|---|---|---|
| | | | | Amount (% of Total Sample Weight) | | | | | |
| Sample | Polyol | DMEA | Deionized Water | HAA | Oxo-Hexyl Acetate | TiO$_2$ | Hexamethylene Diisocyanate | NCO:OH Ratio | Time to Gel |
| 1 | 28.29 | 2.86 | 31.45 | 0 | 9.51 | 29.62 | 6.96 | 1.2 | Over 8 hrs |
| 2 | 28.29 | 2.86 | 31.45 | 3 | 9.51 | 29.62 | 17.28 | 1.2 | Over 8 hrs |
| 3 | 21.39 | 2.16 | 23.78 | 4.94 | 7.19 | 22.39 | 22.08 | 1.2 | Over 8 hrs |
| 4 | 25.8 | 2.61 | 28.68 | 0 | 8.67 | 27.01 | 7.24 | 1.4 | Over 8 hrs |
| 5 | 22.29 | 2.25 | 24.78 | 2.99 | 7.49 | 23.34 | 18.48 | 1.4 | Over 8 hrs |
| 6 | 19.15 | 1.94 | 21.29 | 5.15 | 6.44 | 20.05 | 25.98 | 1.4 | Over 8 hrs |
| 7 | 25.76 | 1.02 | 19.39 | 0 | 5.86 | 25.04 | 22.93 | 1.2 | Did not gel |
| 8 | 22.38 | 0.89 | 16.84 | 2.95 | 5.09 | 21.76 | 30.08 | 1.2 | 6 to 8 hrs |
| 9 | 19.3 | 0.76 | 14.53 | 5.17 | 4.39 | 21.29 | 34.55 | 1.2 | 6 to 8 hrs |
| 10 | 24.84 | 0.98 | 18.69 | 0 | 5.65 | 24.15 | 25.68 | 1.4 | Did not gel |
| 11 | 21.34 | 0.84 | 16.06 | 2.58 | 4.86 | 22 | 32.32 | 1.4 | 6 to 8 hrs |
| 12 | 18.5 | 0.73 | 13.92 | 4.86 | 4.21 | 19.08 | 38.7 | 1.4 | 6 to 8 hrs |

Samples 1 to 6 were prepared from a water-reducible polyester, specifically POLYMAC WR 72-7203, obtained from McWhorter Technologies.
Samples 7 to 12 were prepared with the acrylic polyol prepared as described above.
The HAA used was PRIMID 552, obtained from EMS Chemie.
The Oxo-Hexylacetate used was EXXATE 600, obtained from Exxon. The titanium dioxide was dispersed in acrylic resin, and is obtained from PPG as MEG 340.
Finally, the hexamethylene diisocyanate was commercially obtained from Rhodia as RHODOCOAT WT 2102.

Example 2

A ladder study of two NCO:OH ratios and three HAA levels were performed using Samples 1 to 12, prepared as described in Example 1. BONDERITE 1000 cold rolled steel panels with phosphate treatment, commercially obtained from ACT Laboratories, Inc., were coated with one of Samples 1 to 12 and either left to dry at room temperature or cured for 30 minutes in a 60° C. oven, as indicated in Table 3. The coating on each of the panels was approximately 2 mils dry film thickness. Both one-day and seven-day pencil tests were then performed in accordance with ASTM-D 3363. Briefly, a pencil of calibrated hardness is sharpened to achieve a smooth, flat, level point surface. The pencil point is pressed to the film at a 45° angle and pushed forward while applying downward pressure. The hardest pencil that does not cut through the film is noted as a pencil hardness. The pencil hardness scale is:

6H -5H -4H -3H -2H -H -F -HB -B -2B -3B -4B -5B -6B
HARDEST FILM ----------------→ SOFTEST FILM

TABLE 3

| Sample 1 | cure temperature | 1 day pencil | 7 day pencil |
|---|---|---|---|
| 1 | ambient | <6B | <6B |
| 1 | 30' @ 60° C. | <6B | 6B |
| 2 | ambient | 6B | 4B |
| 2 | 30' @ 60° C. | 4B | 4B |
| 3 | ambient | 3B | HB |
| 3 | 30' @ 60° C. | F | F |
| 4 | ambient | <6B | 6B |
| 4 | 30' @ 60° C. | <6B | 6B |
| 5 | ambient | 3B | HB |
| 5 | 30' @ 60° C. | HB | HB |
| 6 | ambient | HB | HB |
| 6 | 30' @ 60° C. | 2H | 2H |
| 7 | ambient | HB | HB |
| 7 | 30' @ 60° C. | 2H | 2H |
| 8 | ambient | H | H |
| 8 | 30' @ 60° C. | 2H | 2H |
| 9 | ambient | H | H |
| 9 | 30' @ 60° C. | 2H | 2H |
| 10 | ambient | H | H |
| 10 | 30' @ 60° C. | 2H | 2H |
| 11 | ambient | H | H |
| 11 | 30' @ 60° C. | H | 2H |
| 12 | ambient | 2H | 2H |
| 12 | 30' @ 60° C. | H | 2H |

When using the polyester polyol (Samples 1 to 6), a harder film resulted when using HAA than when it was omitted (compare Sample 1 (no HAA) with Samples 2 and 3, and Sample 4 (no HAA) with Samples 5 and 6). Also, the greater the HAA percent, the greater the hardness (compare Sample 2 with 3 and 5 with 6).

When using the acrylic polyol (Samples 7 to 12), the one-day pencil between Samples 7 and 8 were two pencils harder with an ambient cure and no difference with a bake cycle. Significantly, the samples made with the acrylic polyol and no HAA did not gel.

Example 3

The example was performed to confirm that increased performance was attributable to HAA rather than an increased isocyanate load. Two additional Samples, 13 and 14, were prepared in the manner described in Example 1 with the amounts shown in Table 4. As can be seen, the only component that was varied between the A and C versions of each of the samples was the amount of HAA (which, in turn, altered the NCO:OH ratio). The samples were applied to OEM Prime Panels, which are unpolished cold rolled steel coated with ED5000 (an E-coating commercially available from PPG Industries, Inc.) and GPXH 5379 (a silver primer also available from PPG Industries, Inc.), available from ACT Laboratories, Inc.; the panels were cured at ambient temperature.

TABLE 4

|                        | 13A   | 13C   | 14A   | 14C   |
|------------------------|-------|-------|-------|-------|
| acrylic polyol         | 25.76 | 25.76 | 24.84 | 24.84 |
| DMEA                   | 1.02  | 1.02  | 0.98  | 0.98  |
| DI water               | 19.39 | 19.39 | 18.69 | 18.69 |
| HAA                    | 0     | 0.59  | 0     | 1.68  |
| oxo-hexyl acetate solvent | 5.86 | 5.86 | 5.65 | 5.65 |

TABLE 4-continued

|                          | 13A   | 13C   | 14A   | 14C   |
|--------------------------|-------|-------|-------|-------|
| white toner              | 25    | 25    | 24.15 | 24.15 |
| Hexanemethylene diisocyanate | 22.93 | 22.93 | 25.68 | 25.68 |
| DI water                 | 30    | 30    | 30    | 30    |
| NCO:OH Ratio             | 1.2   | 1.11  | 1.4   | 1.11  |

Samples 13A, 13C, 14A and 14C were then subjected to a one-day, four-day and seven-day pencil test. The results are shown in Table 5. Notably, the samples made with HAA gelled while the samples lacking HAA did not.

TABLE 5

|               | 13A | 13C | 14A | 14C |
|---------------|-----|-----|-----|-----|
| 1 day pencil  | HB  | H   | HB  | H   |
| 4 day pencil  | 2H  | 2H  | 2H  | 2H  |
| 7 day pencil  | 2H  | 2H  | 2H  | 2H  |
| Overnight gel | NO  | YES | NO  | YES |

The hardness development between one and four days showed that the film with the HAA was two pencils harder than the film without HAA, even though both films eventually reached the same pencil after seven days. This demonstrates that HAA speeds the hardening process.

The samples were further subjected to a one-day, four-day and seven-day chemical resistance test using deionized water, 10 percent NaOH, 10 percent $H_2SO_4$, gasoline, methylethylketone (MEK), and toluene. The results, shown in Table 6, were evaluated using the following scale:

worst→best results dissolved>blister>stain>haze>ring (all have varying degrees)

TABLE 6

|       | DI WATER | 10% NaOH | 10% $H_2SO_4$ | GASOLINE | MEK | TOLUENE |
|-------|----------|----------|---------------|----------|-----|---------|
| 1 DAY | | | | | | |
| 13A | PASS | SLIGHT HAZE | PASS | RING | RING | RING |
| 13C | PASS | SLIGHT HAZE | PASS | VERY SLIGHT STAIN | RING | RING |
| 14A | PASS | SLIGHT HAZE | SLIGHT RING | SLIGHT RING | RING | RING |
| 14C | PASS | SLIGHT HAZE | PASS | VERY SLIGHT RING | RING | RING |
| 4 DAY | | | | | | |
| 13A | PASS | PASS | PASS | HAZE | RING | RING |
| 13C | PASS | PASS | PASS | RING | RING | RING |
| 14A | PASS | PASS | PASS | HAZE | RING | RING |
| 14C | PASS | PASS | PASS | PASS | RING | RING |
| 7 DAY | | | | | | |
| 13A | PASS | PASS | PASS | PASS | SLIGHT RING | SLIGHT RING |
| 13C | PASS | PASS | PASS | PASS | SLIGHT RING | SLIGHT RING |
| 14A | PASS | PASS | PASS | PASS | SLIGHT RING | SLIGHT RING |
| 14C | PASS | PASS | PASS | PASS | SLIGHT RING | SLIGHT RING |

As can be seen in the table, there was a difference in the development in the chemical resistance at the one-day and four-day time frames. For example, 14C had better resistance to the 10 percent $H_2SO_4$ solution than the 14A after one day, and better gasoline resistance at both one and four days. This demonstrates that improved performance can be attributed to the HAA additive.

Example 4

A two-component system was prepared using the ingredients listed below for Component A and Component B. The NCO:OH ratio of the final product was approximately 1.4.

Two Component Example

| Chemical Name | Amount (grams) |
|---------------|----------------|
| Component A | |
| Acrylic polyol | 22.4 |
| Dimethyl ethanol amine | .9 |
| Deionized water | 16.8 |
| Beta-hydroxyalkylamide | 3 |
| Oxo-hexyl acetate | 5 |
| White WB LIC toner | 21.8 |

-continued

Two Component Example

| Chemical Name | Amount (grams) |
|---|---|
| Component B | |
| Hexamethylene diisocyanate Reduction | 30 |
| Deionized water | 30 |

Component A was prepared generally as described in Example 1. Component B was added to Component A prior to use. After Components A and B were thoroughly mixed, less than 5 minutes, deionized water was added with slow mixing until a homogenous system was reached, which again took less than about 5 minutes.

Whereas particular embodiments of this invention have been described above for purposes of illustration, it will be evident to those skilled in the art that numerous variations of the details of the present invention may be made without departing from the invention as defined in the appended claims.

What is claimed is:

1. An aqueous composition comprising:
   a) an active hydrogen-containing polymer;
   b) an isocyanate; and
   c) beta-hydroxyalkylamide.
2. The composition of claim 1, wherein said active hydrogen-containing polymer is an acrylic polyol, a polyester polyol or mixtures thereof.
3. The composition of claim 1, wherein said isocyanate is a polyisocyanate.
4. The composition of claim 3, wherein said polyisocyanate isocyanate is selected from the group hexamethylene diisocyanate, 2,2,4-trimethylhexamethylene diisocyanate, 2,4,4-trimethylhexamethylene diisocyanate, meta-($\alpha,\alpha,\alpha'$, $\alpha'$-tetramethylxylylenediisocyanate, 1-isocyanato-3,3,5-trimethyl-5-isocyanatomethyl cyclohexane, bis(4-isocyanatocyclohexyl)methane, biuret derivatives of diisocyanates, uretdione derivatives of diisocyanates, isocyanurate derivatives of diisocyanates, and urethane adducts of diisocyanates with polyols.
5. The composition of claim 4, wherein said isocyanate is hexamethylene diisocyanate.
6. The composition of claim 1, wherein the NCO:OH ratio is between about 0.5 and 1.8.
7. The composition of claim 6, wherein the NCO:OH ratio is between about 1.1 and 1.4.
8. The composition of claim 1, wherein said beta-hydroxyalkylamide is bis[N,N-di(beta-hydroxyethyl)] adipamide.
9. The composition of claim 1, wherein the active hydrogen groups on said active hydrogen-containing polymer are hydroxyl groups.
10. The composition of claim 1, wherein said active hydrogen-containing polymer is an acrylic polyol having a glass transition temperature of at least 0° C.
11. The composition of claim 10, wherein said acrylic polyol is comprised of a mixture of polymerizable ethylenically unsaturated monomers.
12. The composition of claim 1, wherein said active hydrogen-containing group is an acrylic polyol comprising styrene, N-butylacrylate and hydroxyethylmethacrylate, said isocyanate is hexamethylene diisocyanate, and said beta-hydroxyalkylamide is bis [N,N-di(beta-hydroxyethyl)] adipamide.
13. The composition of claim 1, wherein said active hydrogen-containing group is a polyester polyol.
14. An aqueous composition comprising:
    a) a polyester polyol, an acrylic polyol, or mixtures thereof;
    b) an isocyanate; and
    c) a beta-hydroxyalkylamide.
15. The composition of claim 14, wherein said isocyanate is a polyisocyanate.
16. The composition of claim 14, wherein said isocyanate is selected from the group hexamethylene diisocyanate, 2,2,4-trimethylhexamethylene diisocyanate, 2,4,4-trimethylhexamethylene diisocyanate, meta-($\alpha,\alpha,\alpha',\alpha'$-tetramethylxylylenediisocyanate, 1-isocyanato-3,3,5-trimethyl-5-isocyanatomethyl cyclohexane, bis(4-isocyanatocyclohexyl)methane, biuret derivatives of diisocyanates, uretdione derivatives of diisocyanates, isocyanurate derivatives of diisocyanates, and urethane adducts of diisocyanates with polyols.
17. The composition of claim 15, wherein said isocyanate is hexamethylene diisocyanate.
18. The composition of claim 14, wherein the NCO:OH ratio is between about 0.5 and 1.5.
19. The composition of claim 14, wherein the NCO:OH ratio is between about 1.1 and 1.4.
20. The composition of claim 14, wherein said beta-hydroxyalkylamide is bis[N,N-di(beta-hydroxyethyl)] adipamide.
21. A composition comprising:
    a) water; and
    b) a mixture comprising:
       1) a polymer having active hydrogen-containing groups;
       2) an isocyanate; and
       3) beta-hydroxyalkylamide.
22. The composition of claim 21, wherein said active hydrogen-containing groups are hydroxyl groups.
23. The composition of claim 22, wherein said polymer is an acrylic polyol, a polyester polyol, or mixtures thereof.
24. The composition of claim 21, wherein said isocyanate is a polyisocyanate.
25. The composition of claim 24 wherein said isocyanate is selected from the group hexamethylene diisocyanate, 2,2,4-trimethylhexamethylene diisocyanate, 2,4,4-trimethylhexamethylene diisocyanate, meta-$\alpha,\alpha,\alpha',\alpha'$-tetramethylxylylenediisocyanate, 1-isocyanato-3,3,5-trimethyl-5-isocyanatomethyl cyclohexane, bis(4-isocyanatocyclohexyl)methane, biuret derivatives of diisocyanates, uretdione derivatives of diisocyanates, isocyanurate derivatives of diisocyanates, and urethane adducts of diisocyanates with polyols.
26. The composition of claim 21, wherein said isocyanate is hexamethylene diisocyanate.
27. A two-component coating system wherein:
    A) said first component comprises:
       1) an active hydrogen-containing polymer;
       2) beta-hydroxyalkylamide; and
       3) water; and
    B) said second component comprises an isocyanate.
28. The two-component system of claim 27, wherein said polymer is an acrylic polyol, a polyester polyol or mixtures thereof.
29. The two-component system of claim 28, wherein said isocyanate is hexamethylene diisocyanate.
30. The two-component system of claim 29, wherein said beta-hydroxyalkylamide is bis[N,N-di(beta-hydroxyethyl)] adipamide.

31. A method for coating a substrate comprising:
 a) applying to said substrate the composition of claim 1; and
 b) curing said coating;
wherein the curing of step b) is effected at ambient temperature or low bake heat.

32. A substrate coated with the coating of claim 1.

33. The substrate of claim 32, wherein the coating is approximately 2.5 mils thick or less.

34. The substrate of claim 32, wherein said substrate is comprised of ferrous metal.

35. The substrate of claim 32, wherein said substrate is comprised of non-ferrous metal.

* * * * *